Oct. 18, 1960
K. RANTSCH
2,956,344
INDICATING DEVICE FOR USE IN COMPENSATING DISPLACEMENTS
IN MACHINE TOOLS CAUSED BY TEMPERATURE CHANGES
Filed Jan. 28, 1959
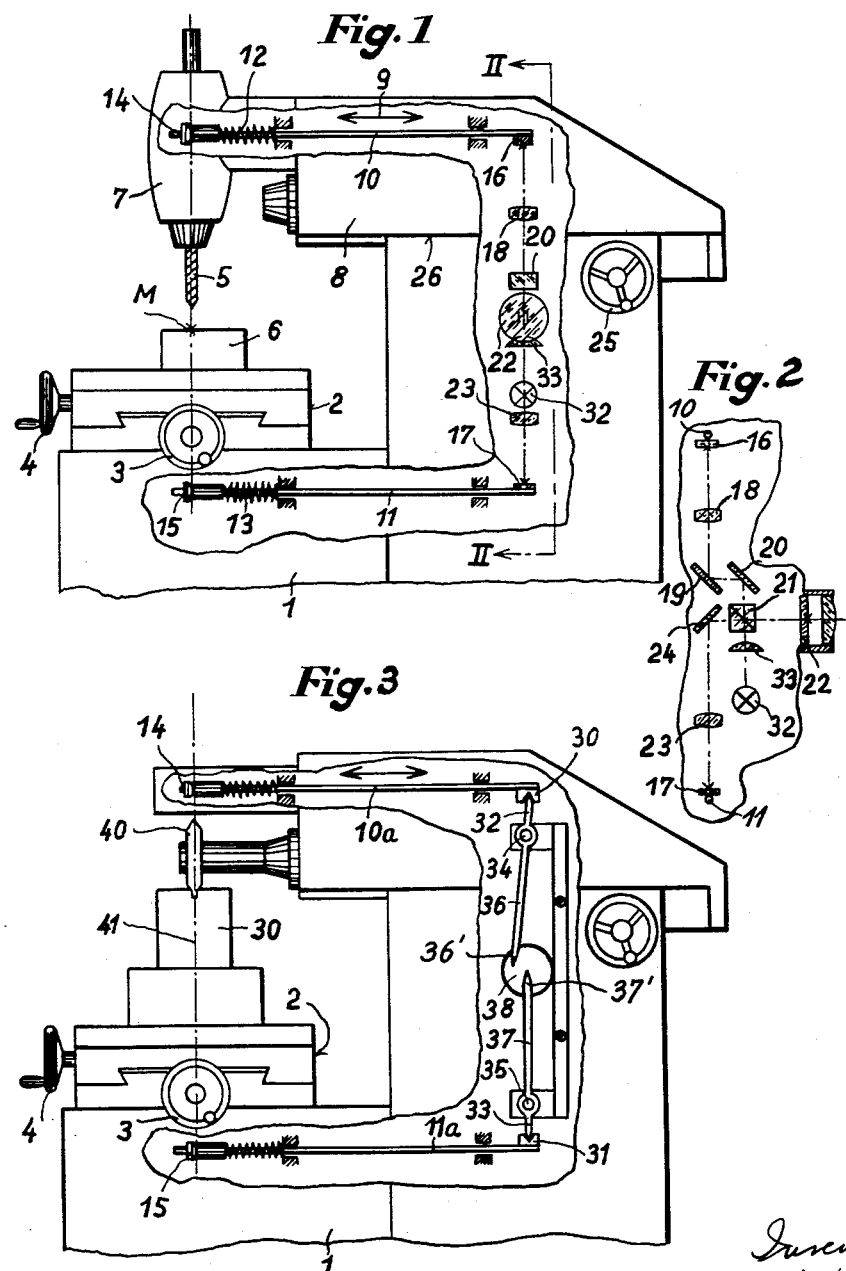
Inventor
Kurt Rantsch
By
Singer Stern & Carlberg
attys

United States Patent Office 2,956,344
Patented Oct. 18, 1960

2,956,344

INDICATING DEVICE FOR USE IN COMPENSATING DISPLACEMENTS IN MACHINE TOOLS CAUSED BY TEMPERATURE CHANGES

Kurt Rantsch, Wetzlar, Germany, assignor to M. Hensoldt & Sohne, Optische Werke A.G., Wetzlar, Germany Filed Jan. 28, 1959, Ser. No. 789,709

Claims priority, application Germany Feb. 3, 1958

8 Claims. (Cl. 33—174)

The invention relates to machine tools provided with means for coordinated machining of workpieces and particularly is directed to an indicating device for the compensation of displacements caused by temperature differences in a device for coordinate measurement or machining of workpieces between a coordinate measuring table and a carrier of a measuring tracer or a carrier of a workpiece. Such temperature differences are caused, for instance, by the drive motor, the gearing, or even by changes in the ambient temperature, because the machine parts surrounding these parts convey the generated thermal energy only very slowly and with losses. As a result, there are produced irregular expansions of the individual parts of the machine which will render the adjustment of the tool spindle with respect to the coordinate point incorrect.

It is an object of the present invention to provide means which will permit an exact compensation of each displacement of the spindle relative to the adjusted point on the coordinate table. The invention provides for this purpose a first rod supported at one of its ends on the tool support, and a second rod supported at one of its ends on the measuring table. These rods have a small degree of thermal expansion and their free ends are connected with means for indication of the change of their positions when changes in the temperature take place.

The operation of such a device is as follows: Owing to the small degree of thermal expansion of the rods the length of the rods will remain constant to a satisfactory degree of accuracy even when the temperature changes are substantial. If, however, the tool support is displaced as a result of a change in temperature, then the tool support will displace also the rod carried by the support. This will change the position of the free end of the rod relative to the other rod and the indicating means connected to the free ends of these rods will indicate this change in position.

By observing said indicating means one will be able to impart a corresponding movement, for instance, to the measuring table by moving it in reverse direction a corresponding distance. The rod which is supported by said measuring table will be moved by the latter, and the indicating means connected with this rod will indicate a compensating displacement. The measuring table will be readjusted to such an extent that both indicating means will show the same deflection.

Preferably, the free ends of the rods are connected each to an indicator in such a manner that both positions of the indicators can be observed in a common window. This permits a rapid and satisfactory observation of each change in the position of the measuring table or of the tool support.

Each indicator can be formed by a double arm lever, one arm of which is connected with the free end of the rod and the other arm of which will appear as the respective indicator in the observation window.

The invention is not limited to the described employment of mechanical indicating means. In fact, it is possible to employ also optical means to advantage. In such a case the free ends of the rods carry measuring marks, and reproducing optical elements are provided for bringing the images of both these marks into superimposition in a common observation window. In such a modified arrangement one of the measuring marks is displaced when the tool support or the measuring table is displaced as a result of temperature changes.

In the same manner as in case of the above described mechanical arrangement, a reverse movement can be imparted to the displaced part, thus compensating the influence of the temperature change.

Preferably, one of the measuring marks is formed by a pair of spaced parallel lines or a so called "double line," and the other mark by a single line. In this case the single line mark can be adjusted to a position between the two spaced parallel lines which arrangement will permit a quick and highly accurate adjustment.

A magnifying glass is preferably disposed over the reading window. Depending upon the degree of enlargement of the magnifying glass a displacement of the indicating line can be recognized with the desired degree of accuracy.

In further development of the invention, an abutment is provided in the tool support and another abutment in the measuring table for the respective rods. The contact points between the rods and the abutments are disposed in a plane containing the axis of the spindle when the latter is arranged vertically. This positioning of the abutments is selected in order to be able to maintain the spindle axis in its relative position to the adjusted measuring point. This can be obtained with a high degree of accuracy, when the ends of the rods are arranged in a plane containing the axis of the spindle.

When the axis of the spindle is arranged horizontally, as is in the case of a grinding machine, then the abutment in the tool support, for instance, grinding wheel support is preferably disposed in the plane of the grinding wheel, because it is important to compensate the relative changes in the position of the grinding wheel edge with respect to the measuring point.

In some cases it will be necessary to have a temperature compensation in two coordinate directions, particularly in case of an asymmetrical construction of the machine. In such a case the above described compensation means are provided in each coordinate direction.

The present invention is not limited to machine tools but may also be used advantageously in coordinate measuring devices.

The drawing illustrates by way of example two embodiments of the invention, namely as follows:

Fig. 1 shows a drilling machine with an optical compensation indicating device.

Fig. 2 shows a diagrammatical view of the optical compensating device along the line II—II of Fig. 1, and Fig. 3 shows a grinding machine with mechanical indicating means.

Referring to Fig. 1 of the drawing, the machine base 1 is provided with a measuring table 2 which is horizontally displaceable in two directions at right angles to each other. The displacement is effected in known manner by threaded spindles operated by the handwheels 3 and 4 respectively. The machine base 1 also contains a drive mechanism for a drill 5. A work piece 6 disposed on the table 2 is to be drilled at the point M. The drill 5 is carried by a tool support 7 which is connected by a cantilever 8 with a vertical column extending upwardly from the machine base 1. In case of temperature changes the cantilever 8 will expand or contract horizontally in the direction of the double arrow 9. This will cause a lateral displacement of the vertical axis of the tool support 7 and the drill 5 will no longer engage the point M. In order to prevent an incorrect drilling of the workpiece 6 a horizontal rod 10 of small thermal expansion is supported in the cantilever 8. A corresponding horizontal rod 11 is placed in the machine base 1. The rods 10 and 11 are urged axially by springs 12 and 13 with one of their ends against the abutments 14 and 15 in the tool support and in the machine base. The other ends of the rods 10 and 11 carry the measuring marks 16 and 17. An image of the measuring mark 16 is projected by a lens 18 and deflecting mirrors 19 and 20 and an optical separating cube 21 into a reading window 22. The mark 17 is projected by a lens 23 and a deflection mirror 24 and said separating cube 21 into the same reading window 22. Both marks 16 and 17 are illuminated by a common source of light 32. The light rays from said source 32 pass through a condenser 33 and are deflected by the separating cube 21 into the projecting path for the images of the marks 16 and 17.

The mark 17 consists of a single line, and the mark 16 of a pair of spaced parallel lines or a so called "double line." In the correct position of the machine the double line mark 16 will enclose the single line mark 17, producing a composite image as shown in the window 22 in Fig. 1.

In case the cantilever 8 changes its length in such a manner that the drill 5 in Fig. 1 is, for instance, displaced to the left hand side, the rod 10 will be moved in axial direction to the left. The mark 16 will move away from its position as shown in the reading window 22. One can now rotate the handwheel 25 and move the cantilever 8 in its guide way 26 in such a manner that the cantilever 8 and the rod 10 will move to the right so that the "double line" mark 16 will return to its original position and will again enclose the single line mark 17.

The two horizontal rods 10 and 11 and the abutments 14 and 15 are also employed in the modified embodiment of the invention illustrated in Fig. 3. In this modified embodiment the drill 5 is replaced by a grinding wheel 40. The abutments 14 and 15 are so arranged that the rods 10a and 11a engage the abutments in a vertical plane 41 passing through the grinding wheel 40, which rotates about a horizontal axis, because in this case the accurate position of the edge of the grinding wheel is of great importance.

Contrary to the showing in Fig. 1, the rods 10a and 11a in the modification of the invention illustrated in Fig. 3 are provided with knife-edge bearings 30 and 31 which are engaged by the ends 32 and 33 of indicator hands 36 and 37 which are rotatably supported between their ends on pivots 34 and 35 respectively.

In their correct or normal position the indicator hands 36 and 37 are arranged with their indicator ends 36' and 37' exactly opposite each other. When one of the rods is displaced, for instance the rod 10 as shown in Fig. 3, the indicator 36 engaging the rod 10 rotates clockwise. A rotation of the handwheel 25, however, will reverse this displacement of the tool support. The indicator ends 36' and 37' can be observed through a magnifying glass 38.

What I claim is:

1. In an indicating device for use in compensating the displacement caused by temperature changes between a coordinate measuring table and a support for a tracer or tool respectively in a machine tool or a coordinate measurement machine respectively, the combination of a machine base having mounted thereon said measuring table and a vertical column carrying at its upper end a horizontally extending cantilever, the outer end of which extends over said measuring table and carries the tool support, a first horizontal rod having a small thermal expansion slidably mounted in said cantilever, abutment means on said tool support and engaged by one end of said rod, a second horizontal rod having a small thermal expansion slidably mounted in said base and parallel to said first rod, another abutment means on said measuring table and engaged by one end of said second rod, yieldable means for urging said rods against said abutment means and means arranged at the other ends of said rods for indicating the horizontal displacements in the position of said tool support and said measuring table due to temperature changes.

2. In an indicating device for use in compensating the displacement caused by temperature changes between a coordinate measuring table and a support for a tracer or tool respectively in a machine tool or a coordinate measurement machine respectively, the combination of a machine base having mounted thereon said measuring table and a vertical column carrying at its upper end a horizontally extending cantilever, the outer end of which extends over said measuring table and carries the tool support a first horizontal rod having a small thermal expansion slidably mounted in said cantilever, abutment means on said tool support and engaged by one end of said rod, a second horizontal rod having a small thermal expansion slidably mounted in said base and parallel to said first rod, another abutment means on said measuring table and engaged by one end of said second rod, yieldable means for urging said rods against said abutment means and means arranged at the other ends of said rods for indicating the horizontal displacements in the position of said tool support and said measuring table due to temperature changes, said means including two indicating hands, means for operatively connecting said hands with said rods, and a single window for observing said two hands.

3. In an indicating device for use in compensating the displacement caused by temperature changes between a coordinate measuring table and a support for a tracer or tool in a machine tool or a coordinate measurement machine respectively, the combination of a machine base having mounted thereon said measuring table and a vertical column carrying at its upper end a horizontally extending cantilever, the outer end of which extends over said measuring table and carries the tool support a first horizontal rod having a small thermal expansion slidably mounted in said cantilever, abutment means on said tool support and engaged by one end of said rod, a second horizontal rod having a small thermal expansion slidably mounted in said base and parallel to said first rod, another abutment means on said measuring table and engaged by one end of said second rod, yieldable means for urging said rods against said abutment means and means arranged at the other ends of said rods for indicating the horizontal displacements in the position of said tool support and said measuring table due to temperature changes, said means including two indicating hands pivotally supported between their ends, means pivotally connecting one of the ends of said hands with said rods, and a single observation window in which the two other indicating ends of said hands are visible.

4. In an indicating device for use in compensating the displacement caused by temperature changes between a coordinate measuring table and a support for a tracer or tool respectively in a machine tool or a coordinate measurement machine respectively, the combination of a machine base having mounted thereon said measuring table and a vertical column carrying at its upper end a horizontally extending cantilever, the outer end of which extends over said measuring table and carries the tool support a first horizontal rod having a small thermal expansion slidably mounted in said cantilever, abutment means on said tool support and engaged by one end of said rod, a second horizontal rod having a small thermal expansion slidably mounted in said base and parallel to said first rod, another abutment means on said measuring table and engaged by one end of said second rod, yieldable means for urging said rods against said abutment means and means arranged at the other ends of said rods for indicating the horizontal displacements in the position of said tool support and said measuring table due to temperature changes, said means including an indicating mark at each said other end of said rods, a single observation device spaced from said mark, and optical means for projecting images of said marks into said observation device.

5. An indicating device according to claim 4, in which one of said indicating marks consists of two closely spaced parallel lines and the other mark consists of a single line.

6. An indicating device according to claim 4, including a magnifying glass arranged in the reading window of said observation device.

7. An indicating device according to claim 1, particularly for a machine tool with a vertical operating shaft, in which said abutment means for said tool support and said measuring table are combined to serve as bearings for the two rods and that the points of contact between the rods and said abutments are arranged in a vertical plane containing the axis of said operating shaft.

8. An indicating device according to claim 1, particularly for a machine tool having a horizontal operating shaft, such as a grinding machine, in which said abutment means on the tool support and the measuring table are constructed to form bearings for said two rods, and that the points of contact between said ends of the rods and said abutments are arranged in a plane passing through the operating plane of the tool.

References Cited in the file of this patent

UNITED STATES PATENTS

| | | |
|---|---|---|
| 2,335,869 | Maris | Dec. 7, 1943 |
| 2,345,931 | Gates | Apr. 4, 1944 |
| 2,666,262 | Ruge | Jan. 19, 1954 |
| 2,744,181 | Rea | May 1, 1956 |
| 2,784,496 | Rousse | Mar. 12, 1957 |